Patented July 6, 1948

2,444,817

UNITED STATES PATENT OFFICE 2,444,817

PROCESS FOR POLYMERIZING VINYL COMPOUNDS AND PRODUCTS FORMED THEREBY

Reid G. Fordyce, Dayton, Ohio, assignor to Monsanto Chemical Company, St. Louis, Mo., a corporation of Delaware No Drawing. Application March 7, 1945, Serial No. 581,554

8 Claims. (Cl. 260—78.5)

This invention relates to the polymerization of vinyl compounds and particularly to the formation of clear, transparent bodies substantially insoluble in organic solvents and having an improved thermal stability. It relates particularly to a process for polymerizing vinyl acetate and to improved polyvinyl acetate interpolymers.

When vinyl acetate is polymerized by itself, the polymer obtained is generally soft, soluble in a larger variety of organic solvents and hence of limited utility. In order to increase the hardness and decrease the solubility of polyvinyl acetate, it may be copolymerized with so-called cross-linking agents yielding somewhat harder bodies having a decreased solubility in organic solvents. While some improvement in these respects may be thus obtained, it was discovered that the amount of cross-linking agent which could be introduced and clear interpolymers obtained was limited to 10 or 15% by weight of the total polymerizable material, because of the appearance with the higher concentrations of the cross-linking agent of a non-homogeneous, opaque type of polymer which destroyed the desired clarity and transparency of the object. As a result it was impossible to develop to the ultimate the desirable physical properties of polymeric vinyl acetate, particularly with respect to form stability, resistance to solvents, heat distortion point, etc., and at the same time retain the glass-like clarity desirable for many purposes.

In other words, in order to increase the usefulness of polymerized vinyl acetate as a structural material, it is necessary to produce interpolymers with at least 20% or more of the cross-linking agent.

I have now discovered that interpolymers of vinyl acetate and such cross-linking agents as the diallyl and the dimethallyl esters of maleic, fumaric, succinic and adipic acids may be made in clear and transparent form by carrying out the conjoint polymerization thereof in the presence of from 2½% to 3½% or 4% by weight of benzoyl peroxide.

The present process is, accordingly, limited to mass polymerization as distinguished from solution or emulsion polymerization and is consequently adapted to the production of clear, cast objects of high strength, high heat resistance and excellent resistance to the action of organic solvents. Cast objects are prepared by mixing together vinyl acetate and a diallyl or dimethallyl ester of an acid such as maleic, fumaric, succinic and adipic acids in such quantities that the mixture contains at least 20% by weight of said ester. To the mixture of vinyl acetate and the ester is then added from 2½% to 3½% or 4% by weight of benzoyl peroxide, the peroxide being dissolved in the mixture. The material so prepared is now ready to be polymerized, which is generally done by pouring the polymerizable materials as prepared above into a mold of a shape desired for the final casting. The mold so formed is subjected to any polymerizing temperature suitable for vinyl acetate itself and permitted to remain at this temperature until a hard, solid body is obtained. Temperatures suitable for polymerizing vinyl acetate may be from 30° C. to 45° C. or 50° C. Similar temperatures may be employed when copolymerizing vinyl acetate with the diallyl and dimethallyl esters herein described. Treatment at the polymerizing temperature is continued until the monomeric material has polymerized to the solid state, after which it is desirably submitted to a higher temperature of the order of 100° C.–110° C. for a somewhat shorter length of time in order to further harden the material.

The polymerized mass may then be removed from the mold as a glassy, clear, hard object of high resistance to organic solvents and of increased thermal stability.

When mixtures containing vinyl acetate and cross-linking agents in the amount of at least 20% by weight of said mixture are polymerized in the absence or in the presence of less than 2½% by weight of polymerization catalyst, a peculiar type of polymeric body is formed which resembles cotton linters or pop corn in appearance. By reason of its appearance, it is generally referred to as a "pop corn" polymer. Its occurrence in cast bodies is objectionable because of the lack of transparency imparted by this modification. However, by means of the invention herein disclosed, the occurrence of this objectionable variety of polymer is suppressed and glassy, clear objects obtained which retain the desirable properties of vinyl acetate with high concentrations of cross-linking agents.

In order to illustrate my invention, mixtures of vinyl acetate and diallyl adipate were prepared and polymerized with varying quantities of benzoyl peroxide. It was discovered that when the diallyl adipate content of the mixture was maintained at a relatively low concentration, that is, of the order of 10% to 15% by weight, a clear resin could be obtained with one or two per cent by weight of benzoyl peroxide. Such resin, however, did not possess sufficient resistance to heat to make it useful for a great many purposes. When, however, the content of diallyl adipate was increased to 20%, and even as much as 50% by weight, a concentration of 2% of benzoyl peroxide yielded a considerable quantity of "pop corn" polymer. By increasing the content of benzoyl peroxide to 2½%, mixtures of vinyl acetate and diallyl adipate could be polymerized to form an exceptionally hard and clear interpolymer without the formation therein of any traces of the "pop corn" polymer. This effect was also obtained with as much as 3½% and also with 4% of benzoyl peroxide. Proportions of benzoyl peroxide above 4% by weight based on the polymerizable materials are generally undesirable because of the low strength and low molecular weight of the materials produced thereby.

EXAMPLE 1

In the following table are collected the results obtained by polymerizing mixtures of vinyl acetate and diallyl adipate, the polymerization being carried out at a temperature of 45° C. for 5 days, after which the material was heated for one hour at 100° C.

Table 1

| Vinyl Acetate, Parts | Diallyl Adipate, Parts | Benzoyl Peroxide, Per cent | Remarks |
|---|---|---|---|
| 90 | 10 | 2 | Clear resin. |
| 85 | 15 | 2 | Do. |
| 80 | 20 | 2 | "Pop corn" polymer. |
| 70 | 30 | 2 | Do. |
| 50 | 50 | 2 | Do. |
| 80 | 20 | 2½ | Clear, hard. |
| 70 | 30 | 2½ | Do. |
| 60 | 40 | 2½ | Do. |
| 50 | 50 | 2½ | Do. |
| 60 | 40 | 3½ | Do. |

Similar results were obtained employing the diallyl esters of maleic, fumaric and succinic acids.

EXAMPLE 2

Mixtures of monomeric vinyl acetate and dimethallyl adipate containing varying amounts of benzoyl peroxide were polymerized at 35° C. for 113 hours, then heated to 80° C. for one hour and then to 100° C. for one hour. The composition of the mixtures polymerized together with the observations made upon the products so produced are recorded in Table 2.

Table 2

| Vinyl Acetate, Parts | Dimethallyl Adipate, Parts | Benzoyl Peroxide, Percent | Remarks |
|---|---|---|---|
| 97 | 3 | 1 | Clear resin. |
| 90 | 10 | 1 | Do. |
| 85 | 15 | 2 | Do. |
| 80 | 20 | 2 | "Pop corn" polymer. |
| 75 | 25 | 2 | Do. |
| 70 | 30 | 2 | Do. |
| 80 | 20 | 2½ | Clear, hard resin. |
| 75 | 25 | 2½ | Do. |
| 70 | 30 | 2½ | Do. |
| 60 | 40 | 2½ | Do. |
| 50 | 50 | 2½ | Do. |
| 70 | 30 | 3½ | Do. |

Similar results were obtained as described above employing the dimethallyl esters of maleic, fumaric and succinic acids.

For many purposes a preliminary polymerization of mixtures of vinyl acetate and the diallyl and dimethallyl esters, defined above, may be carried out externally of the mold by polymerizing in ordinary polymerizing equipment to form a flowable or syrupy polymer, after which the syrup so produced may be poured into molds and the polymerization carried to completion in such molds.

Plasticizers, softening agents, dyes, pigments, fillers, etc. may be incorporated into the fluid resin before its complete polymerization for the production of products having special properties.

As herein disclosed, the amount of benzoyl peroxide employed is a critical feature of the invention. The amount employed herein is expressed as weight per cent based upon the total polymerizable material present in the mixture.

This application is a continuation-in-part of my application Serial No. 390,150, filed April 24, 1941, now abandoned.

What I claim is:

1. The process which comprises polymerizing in mass a mixture consisting of vinyl acetate and an ester selected from the class consisting of the diallyl and dimethallyl esters of maleic, fumaric, succinic and adipic acids and in which mixtures said esters are contained in amount of from 20% to 50% by weight of polymerizable material in said mixture, by heating said mixture in the presence of from 2½% to 4% by weight based on said mixture of benzoyl peroxide.

2. The process which comprises polymerizing in mass a mixture consisting of vinyl acetate and diallyl adipate, in which mixture the said diallyl adipate is contained in amount of from 20% to 50% by weight thereof, by heating said mixture in the presence of from 2½% to 4% by weight based on said mixture of benzoyl peroxide.

3. The process which comprises polymerizing in mass a mixture consisting of vinyl acetate and diallyl fumarate in which mixture the said diallyl fumarate is contained in amount of from 20% to 50% by weight thereof, by heating said mixture in the presence of from 2½% to 4% by weight based on said mixture of benzoyl peroxide.

4. The process which comprises polymerizing in mass a mixture consisting of vinyl acetate and diallyl succinate in which mixture the said diallyl succinate is contained in amount of from 20% to 50% by weight thereof, by heating said mixture in the presence of from 2½% to 4% by weight based on the monomer mixture of benzoyl peroxide.

5. A glassy, clear copolymer of a monomeric mixture consisting of 50 per cent to 80 per cent of vinyl acetate and 20 per cent to 50 per cent of an ester of the class consisting of the diallyl and dimethallyl esters of maleic, fumaric, succinic and adipic acids, said copolymers having been formed in the presence of from 2½ percent to 4 percent by weight of the monomers of benzoyl peroxide.

6. A glassy, clear copolymer of a monomeric mixture consisting of 50 percent to 80 percent of vinyl acetate and 20 percent to 50 percent of diallyl adipate, said copolymer having been formed in the present of from 2½ percent to 4 percent by weight of the monomer of benzoyl peroxide.

7. A glassy, clear copolymer of a monomeric mixture consisting of 50 percent to 80 percent of vinyl acetate and 20 percent to 50 percent of diallyl fumarate, said copolymer having been formed in the presence of from 2½ percent to 4 percent by weight of the monomer of benzoyl peroxide.

8. A glassy, clear copolymer of a monomeric mixture consisting of 50 percent to 80 percent of vinyl acetate and 20 percent to 50 percent of diallyl succinate, said copolymer having been formed in the presence of from 2½ percent to 4 percent by weight of the monomer of benzoyl peroxide.

REID G. FORDYCE.

REFERENCES CITED

The following references are of record in the file of this patent:

UNITED STATES PATENTS

| Number | Name | Date |
|---|---|---|
| 2,047,398 | Voss et al. | July 14, 1936 |
| 2,238,030 | Bradley | Apr. 15, 1941 |
| 2,311,615 | Zemba et al. | Feb. 16, 1943 |

FOREIGN PATENTS

| Number | Country | Date |
|---|---|---|
| 540,169 | Great Britain | Oct. 8, 1941 |